UNITED STATES PATENT OFFICE.

THOMAS J. MAYALL, OF READING, MASSACHUSETTS.

MANUFACTURE AND COLORING OF RUBBER TOYS, &c.

SPECIFICATION forming part of Letters Patent No. 247,838, dated October 4, 1881.

Application filed May 7, 1881. (No specimens.)

*To all whom it may concern:*

Be it known that I, THOMAS J. MAYALL, of Reading, in the county of Middlesex and Commonwealth of Massachusetts, have invented a new and useful Improvement in the Manufacture and Coloring of Rubber Toys for Children and other Objects, of which the following is a specification.

Heretofore the coloring of toys for children made of rubber has been put on with paints after the rubber has been cured or vulcanized, and consequently it is liable to and does come off by use, and in the hands of young children is often very deleterious to health and dangerous to life.

The object of my invention is to incorporate the colors desired in toys and other objects made of rubber in the rubber before it is cured, so that after the rubber is cured the color will not come off; and it consists in mixing and thoroughly intermingling rubber and colored sulphide or sulphuret of antimony of the color or colors required, dissolving the compound in naphtha or other suitable solvent of rubber to a thin fluid solution, painting the color or colors desired on the toy or other object of rubber after it has been molded into its required shape and form, and then curing the toy or other object and the colors painted onto it together in any suitable way or manner of curing rubber by heat.

By means of recent improvements in the art of reducing natural ores of antimony to sulphides or sulphurets of antimony the sulphides or sulphurets are produced of all colors and shades of colors. I make paints for coloring toys and other objects made of rubber by mixing pure rubber with each and all the various colored sulphides or sulphurets of antimony, and dissolving the compound in naphtha or other solvent of rubber and reducing the solution to the proper degree of fluidity to be conveniently manipulated and applied with a brush, as artists ordinarily apply paints with a brush to canvas.

Having paints made in the way described of all the various colors at hand, a person skilled in the art of painting will apply them to toys and other objects, after they are formed or molded and before they are cured or vulcanized, using such colors and combination of colors and designs as will give the desired ornamental or other appearance to the toy or object. The toy or object is then cured or vulcanized, either pliable and soft or as hard rubber. The colors thus applied and fixed are then permanent, and cannot be rubbed or washed off, being in and a part of the toy and insoluble in any solvent.

I also apply desired colors to rubber toys and other articles by running the compounds of rubber and sulphide or sulphuret of antimony in all the various colors out into very thin sheets. From these thin sheets I cut out patches of any outline of form desired. These patches are affixed to the surface of the toy or other object after it is formed and before it is cured by the use of the fluid paint compound described, and then the whole is cured together by heat in any suitable manner. Thus portraits, landscapes, and pictures of any and all designs may be painted on rubber toys or other objects, or on rubber in any form ready for curing, with the rubber and sulphide of antimony paints described, and made permanent in the rubber by the curing process.

I claim as new and my invention—

1. The above-described improvement in the art of coloring and ornamenting rubber toys and other objects, consisting of painting the surface of the toy or other object when it is ready for curing with paints, made of compounds of rubber and colored sulphides or sulphurets of antimony dissolved, and then curing the whole together, substantially as described.

2. As a new article of manufacture, rubber toys and other objects painted and cured substantially as described.

3. As a new article of manufacture, rubber objects in any shape or form having portraits, landscapes, or any other pictures painted with paints made of rubber and sulphides of antimony dissolved together on the rubber, when it is formed ready for curing, and then cured by heat, substantially as described.

4. The above-described method of coloring or ornamenting rubber toys and other articles consisting of making very thin sheets of rubber and colored sulphides or sulphurets of antimony, cutting patches from the colored sheet and affixing them to the surface of the toy or other object before it is cured, and curing the whole together, substantially as described.

THOS. J. MAYALL.

Witnesses:
CHS. HOUGHTON,
H. KENNEY, Jr.